United States Patent
Dybevik et al.

(10) Patent No.: US 6,464,261 B1
(45) Date of Patent: Oct. 15, 2002

(54) PIPE COUPLING

(75) Inventors: Arthur Dybevik; Ole S. Kvernstuen; Terje Moen, all of Sandnes (NO)

(73) Assignee: Reslink AS, Ålgård (NO)

( * ) Notice: Subject to any disclaimer, the term of this patent is extended or adjusted under 35 U.S.C. 154(b) by 0 days.

(21) Appl. No.: 09/647,037

(22) PCT Filed: Mar. 23, 1999

(86) PCT No.: PCT/NO99/00096

§ 371 (c)(1),
(2), (4) Date: Oct. 26, 2000

(87) PCT Pub. No.: WO99/49257

PCT Pub. Date: Sep. 30, 1999

(30) Foreign Application Priority Data

Mar. 25, 1998 (NO) .................................................. 981344

(51) Int. Cl.⁷ ................................................ F16L 17/00
(52) U.S. Cl. .............................. 285/123.15; 285/123.1; 285/333; 138/113; 138/155
(58) Field of Search ....................... 285/123.15, 123.16, 285/123.1, 333; 138/112, 113, 155, 148

(56) References Cited

U.S. PATENT DOCUMENTS

| | | | |
|---|---|---|---|
| 1,521,482 A | | 12/1924 | Steele |
| 2,054,859 A | * | 9/1936 | Kitching .................. 285/123.1 |
| 2,107,716 A | * | 2/1938 | Singleton .................... 285/333 |
| 3,077,358 A | * | 2/1963 | Costa ....................... 285/123.1 |
| 3,552,779 A | * | 1/1971 | Henderson .................. 285/333 |
| 4,412,584 A | * | 11/1983 | Brandell ................... 285/123.1 |
| 4,759,571 A | | 7/1988 | Stone et al. |
| 5,423,353 A | | 6/1995 | Sorensen |

FOREIGN PATENT DOCUMENTS

| | | |
|---|---|---|
| DE | 38 14 176 | 11/1989 |
| WO | 96/23159 | 8/1996 |

* cited by examiner

Primary Examiner—Lynne H. Browne
Assistant Examiner—Aaron Dunwoody
(74) Attorney, Agent, or Firm—Andrus, Sceales, Starke & Sawall, LLP

(57) ABSTRACT

A coupling for interconnecting two double-walled pipes, e.g. production filter pipes (10, 12). The coupling may have the shape of a connector (10A, 12A) divided into two parts, each part (10A, 12A) being attachable on the end portion of a double pipe (10, 12), the parts (10A, 12A) of the connector being interconnectable, preferably mutually screwable. Such double pipes (10, 12) have two concentric liquid passages, one through the inner pipe (14) and one through the annulus-like, concentric liquid passage 920) between inner pipe (14) and outer pipe (16). In order not to block the outer concentric liquid passage (20) at the joint place (10A, 12A) so that liquid flowing therewithin must be transferred to said smaller pipe through a valve, longitudinally extending, through-going flowing channels (18) have been formed in the joint area; said channels (18) may be distributed circumferentially, thus allowing continuous flow of liquid past the coupling area (10A, 12A).

2 Claims, 2 Drawing Sheets

PIPE COUPLING

BACKGROUND OF THE INVENTION

The present invention relates to a pipe coupling which may have the form of a divided connector for interconnecting two equal double-walled pipes or, respectively, have the form of coupling portions formed on each of the two pipes, wherein each pipe consists of two concentric pipe walls maintained circumferentially equally spaced from each other by means of spacers placed with their longitudinal direction in the direction reaction of flow. Thus, between the two concentric pipes, an inner pipe and an outer pipe, a through-going annulus exists, serving as a liquid passage and which, except from the portions being accommodated by the spacers, is coherent between the end couplings. In the portions provided with spacers, axial channels are disposed, so that liquid passage exists between the through-going annuli.

Double-walled filter pipes are, for example, used in hydrocarbon producing beds in the rock ground. Such filter pipes have longitudinal strainer elements spaced axially and serving to filter away, among other things, formation sand from the oil let into the liquid passage of the double pipe.

A production tubing string can be supplied with oil from said annulus and is, to that end, equipped with a passage, valve, or the like on a suitable place at the extent of the double-walled filter pipe, appropriately adjacent the scarf box thereof which, according to known technique, creates passage from the outer annulus-shaped, concentric liquid passage.

Upon the completion of oil and gas wells, it is often desirable to interconnect two or more such double-walled pipes. When effecting such an interconnection, one has to see to that the inner liquid passage is rectilinear and has a circular circumference, so that also mechanical accessory can pass past the coupling portions, while the outer passage only shall serve to convey liquid. Pressure drop across the outer passage should be as low as possible, and the flowing channel(s) should, therefore, be formed according to a geometry securing low resistance against flowing. It is important that the connector or the coupling portions, respectively, in case they are formed on adjacent pipe end portions, is/are not mechanical weaker than usually used pipe couplings for interconnecting pipes having a single liquid passage, as mechanical loads such as tensile stresses, torsional stresses and bending loads may be high during run-in in the well. The coupling should exhibit the same pressure performance for external and internal pressure as usually used pipe couplings for single course in respect of the inner centric pipe passage.

The internal diameter of the coupling piece/connector or of the threaded or in some other way shaped coupling portions formed at the ends of the individual pipes respectively, must correspond to the internal diameter of the connected inner pipe. The external diameter of the coupling or the coupling portions, respectively, must be smaller than the hole into which the coupling is to be placed.

Two coupling methods for interconnecting double-walled pipes having concentric, separate annulus-like liquid passages are previously known.

(A) An inner pipe is attached to an outer concentric pipe with intermediate spacers in the form of brackets or similar spacing members. In this known design, the inner pipe is at each end equipped with a sealing device entering into sealing engagement upon interconnecting the outer pipes of the double-walled pipes through screwing. In this known double-walled pipe design, the outer pipe normally accommodates all mechanical load.

(B) At each end of a number of outer pipes, an internal, smooth sealing face has been premounted. After all outer pipes have been assembled, an inner, narrower pipe is thereupon inserted, said narrower pipe having sealing devices matching the smooth sealing faces of the cuter pipes.

A coupling device according to (A) represents a relative simple solution. However, it requires that the outer pipe is in a position to accommodate all mechanical load. Therefore, this known coupling device is unfit for use in connection with the aforesaid filter pipes, the outer pipes thereof along certain portions consisting of strainer elements in the form of spun wire filter structures.

The coupling device according to (B) requires that inner as well as outer pipe are mechanically strong due to the fact that they have to carry their own weight and withstand and accommodate mechanical strains and stresses during a separate run-in. As a consequence of that, for example, valves: externally are limited to a diameter corresponding to said smooth sealing face of the outer pipe, the internal diameter of inner pipe having associated valves and similar accessory becomes smaller than desirable. Moreover, the coupling device is time-consuming to install.

SUMMARY OF THE INVENTION

Consequently, according to the present invention, one has aimed at remedying or to a substantial degree reducing deficiencies, disadvantages and restrictions of application and use adhering to known and conventional technique and, thus, providing a pipe coupling device consisting of mutually joinable, preferably screwable coupling portions formed directly on the double pipe ends or, respectively, of corresponding, mutually joinable, preferably screwable parts of a connector, said connector parts each being attachable on an adjacent double pipe end portion. In both the indicated embodiments, the coupling device allows a simple and rapid interconnection of the two double pipes, each of which exhibiting two concentric pipe walls defining an inner separate and an outer separate liquid passage. The inner pipe of the double pipe shall be the mechanically supporting double pipe portion, while handling such as lifting/lowering and interconnection shall take place through the outer surfaces. Commonly used lifting, hoisting, hanging and tightening accessory should be usable in order to mount the double pipes (filter pipes) by means of the coupling device in accordance with the invention in a water, oil or gas well. For use as a filter pipe having longitudinal strainer element in the form of spun wire structures, slits or perforations, not too strict demands should be made on the outer pipe of the double pipes in respect to its mechanical strength, because the outer pipes along a great part of their length can be constituted by the above-mentioned filter representing mechanical weakenings.

Further objects, advantages and features of the coupling device according to the invention are further explained in the following with reference to accompanying drawings showing various exemplary embodiments, and wherein:

BRIEF DESCRIPTION OF THE SEVERAL VIEWS OF THE INVENTION

DETAILED DESCRIPTION THE INVENTION

Figure 1:
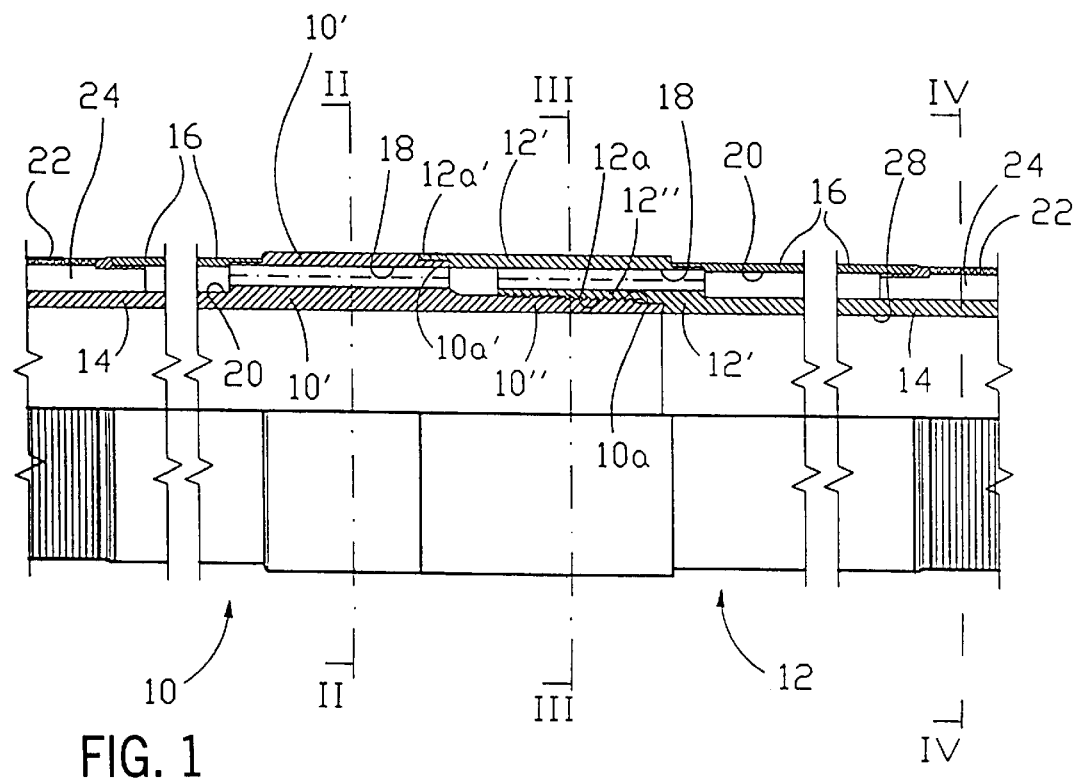
FIG. 1 shows a side elevational view/axial section of two adjacent end portions of two double pipes coupled coaxially together by means of threads screwable together and formed directly on both double pipe portions.
Figures 2, 3, 4:
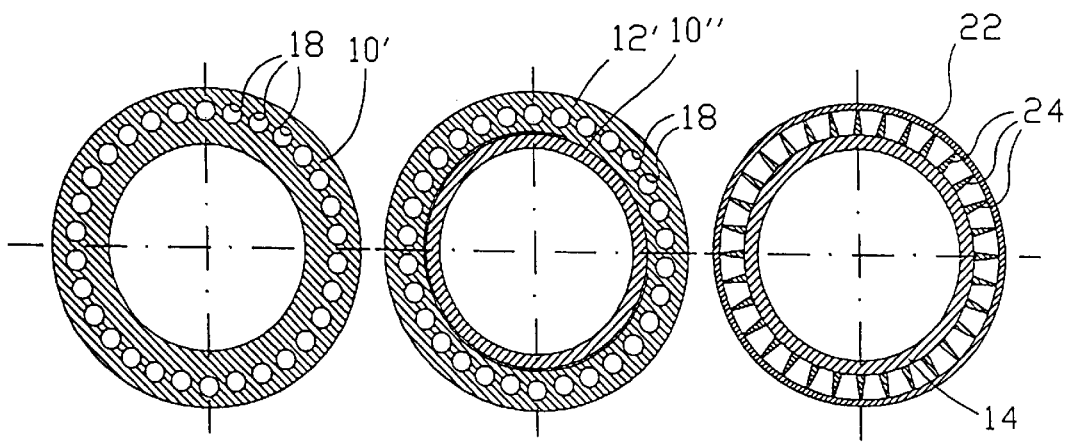
FIG. 2 is a cross-section along the line II—II in FIG. 1.
FIG. 3 is a cross-section along the line III—III in FIG. 1.
FIG. 4 is a cross-section along the line IV—IV in FIG. 1.

First, reference is made to FIGS. 1–4 where a first embodiment of the invention has been shown.

Reference numerals 10 and 12 denote generally two double pipes interconnected by means of a pipe coupling device according to the invention and consisting of an inner pipe 14 and an outer pipe 16.

The end portion of one (the right) double pipe 12 is formed with a first coupling portion 12' comprising an internal socket portion 12" having internal threads 12a cooperating screwable with external threads 10a on a pipe pin portion 10" of another coupling portion 10' with which the other (the left) double pipe 10 is formed.

In accordance with the present invention, each coupling portion 10' and 12' on the double pipes 10 and 12 is formed with a number of longitudinal channels 18 allowing liquid to flow within the outer concentric liquid passage 20. By means of the longitudinal channels formed through the coupling portions 10' and 12' of the double pipes, see FIGS. 2 and 3, the liquid flow in the outer concentric liquid passage 20 can be maintained across a longer longitudinal portion of the producing bed.

As mentioned, in the outer pipe of each double pipe 10 and 12, longitudinal portions are incorporated. These portions are built up as sleeve-shaped strainer members 22 in the form of wire structures kept spaced from the inner pipes 14 by means of longitudinal wires 24, distributed equidistantly along the outer circumference of the inner pipe 14, see FIG. 4.

At a radially outer end portion, one coupling portion 10' has an annular, countersunk portion 10a', allowing a narrower, radially outer annular portion 12a' on the other coupling portion 12' to be pushed thereupon.

Figure 5:
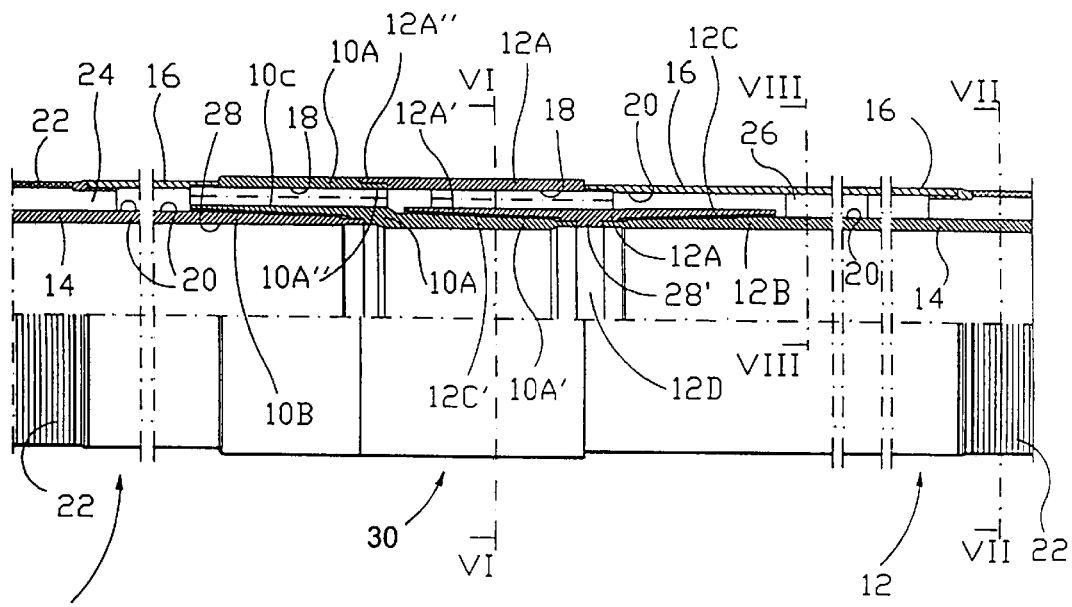
FIG. 5 shows in side elevation view/axial section two substantially annular, screwable parts of a connector which is attached on each of two coaxially positioned double pipes joined together by means of the connector parts.
Figures 6, 7, 8:
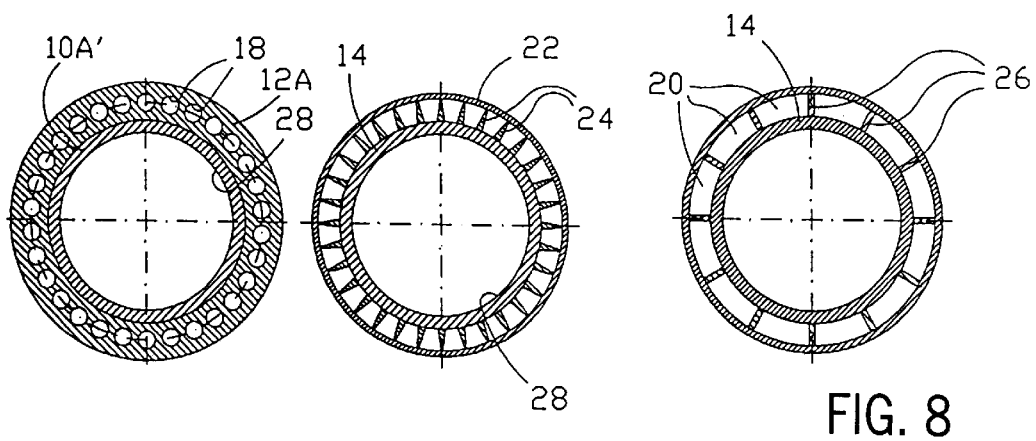
FIG. 6 is a cross-section along the line VI—VI in FIG. 5.
FIG. 7 is a cross-section along the line VII—VII in FIG. 5.
FIG. 8 shows a cross-section along the line VIII—VIII in FIG. 5.

Another embodiment of the invention is shown in FIGS. 5–8, Here, it appears that the inner pipe 14 is kept spaced from the outer pipe 16, concentrically therewith by means of longitudinal, circumferentially equidistantly distributed spacers 26. The bore of the inner pipe 14 is denoted at 28.

Parts and portions in this embodiment, FIGS. 5–8, which are identical or similar to corresponding parts and portions in the embodiment shown in FIGS. 1–4, are not specifically described once more, unless they have close association to parts/portions which are important for the invention and which differ functionally from those of the first embodiment.

In the embodiment according to FIGS. 5–8, the coupling device is formed with two mutually joinable parts 10A and 12A of a connector assembly 30. Each part 10A and 12A of the connector assembly is shaped with a view for attachment to an end piece of a double pipe 14, 16.

Each of the two opposing double pipes 14, 16 to be interconnected coaxially, has a conically tapering, externally threaded pipe pin end 10B and 12B.

Each part 10A and 12A of the connector assembly 30 has an internally threaded socket portion 10C and 12C where the threads are complementary to the external pipe pin end threads of the double pipes 10 and 12. The connector parts 10A, 12A are screwed tight upon the pin end portions 10B, 12B of the two double pipes 14, 16.

One annular connector part 12A has two oppositely directed, internally threaded socket portions of which the other one is denoted at 12C'. The other connector part 10A has an externally threaded pin end portion 10A' adapted to be screwed together with the opposing, internally threaded socket portion 12C' of the connector part 12A, in order to join the two double-walled filter pipes 14, 16 and 14, 16 with each other.

The threads which are formed on the pin end portions 10B, 12B of two double pipes 14, 16 and within the oppositely directed socket portions 12C, 12C' of one connector part 12A and within the pipe socket portion 10C of the other connector part 10A as well as on the pipe pin end, all have a diameter substantially corresponding to the outer diameter of the inner pipe 14.

As in the embodiment shown in FIGS. 1–4 , both connector parts 10A and 12A are formed with a number of longitudinal/axial, through-going channels 18. The double pipe's 12 connector part 12A has a middle portion 28' extending annularly and engaging in between the opposing, adjacent end faces of the two double pipes. A radially outer end portion 12A" of the connector part 12A having substantially the same diameter as an outer pipe 16, has been pushed concentrically with an internally thickness-reduced end portion in on a tapering end/corner portion 10A" of an outer potion of the connector part 10A.

The longitudinally, preferably axially extending channels or bores 18 together forming the outer liquid passage through at least the major part of the length extent of the coupling portions 10', 12', FIGS. 1–4, or of the length extent of the connector parts 10A, 10B, FIGS. 5–8, respectively, may have different cross-sectional shapes, e.g. circular, oval, polygonal, etc., and they may be arranged with equal intermediate spaces in the circumferential direction or according to particular patterns, e.g. arranged in twos circular rows of holes; bores 18 in one row being angularly displaced in relation to the bores 18 in the other row, or distributed according to the geometric patterns in the lateral direction. The invention has been shown and described in connection with couplings for production filter pipes. Typically, the filters 22, 24 have filter slits having a width equal to 0,2 millimeter. The connector 10A,12A or the coupling portions 10', 12', respectively, according to the invention, has/have been shown without sealing means such as O-rings or similar means in connection with the outer longitudinal/axial flowing channels 18. When a need exists for tight outer pipes 16 and tight outer flowing channels 18, per se known sealing means may be used; such means exist in a plurality of different shapes and designs.

The inner pipe 14 is coupled together with only premium thread connections and is, therefore, not reduced in respect of the mechanical capacity, resistance or pressure performance thereof in relation to using an ordinary, simple pipe coupling. There exists a firm mechanical connection between inner threads and outer surface. This connection can accommodate and transfer axially directed loads and torsional stresses and strains.

What is claimed is:

1. A pipe coupling for interconnecting double-walled pipes (10, 12) having radially spaced inner (14) and outer

(16) pipe walls forming longitudinally extending, annular liquid passages (20) in the pipes, said pipe coupling comprising:

first and second sleeve-shaped connector parts (10A, 12A), each of said connector parts having ends spaced along an axis of the part, each of said connector parts having one end (10C, 12C) adapted for threaded attachment to an end portion of the inner wall (14) of a double-walled pipe (10, 12), the other ends of each of said connector parts being adapted for interconnection of said parts; each of said connector parts having peripherally positioned, axially extending, through going channels (18) alignable with the liquid passages (20) of the pipes when said connector parts are attached to the pipes for allowing liquid flow through the pipe coupling and between the liquid passages of the pipes; said first connector part (10A) having an externally threaded pipe pin part (10A') at said other end adapted to be screwed into an internally threaded socket part (12C') at said other end of the second part, said one ends of said first and second parts being provided with internal threads on an attachment portion thereof having substantially the same effective diameter as a threaded, radially outermost wall face of the inner pipe so that the inner walls of the double-walled pipes form support for the coupled pipe structure, said pipe coupling having an outer diameter that is insignificantly larger than the outer diameter of the double walled pipe.

2. A pipe coupling according to claim 1 wherein said other ends of said first and second parts have external surface portions that overlap when said parts are interconnected.

* * * * *